J. HLASZITSKA.
BRAKE CLUTCH.
APPLICATION FILED DEC. 13, 1913.
1,111,582.
Patented Sept. 22, 1914.
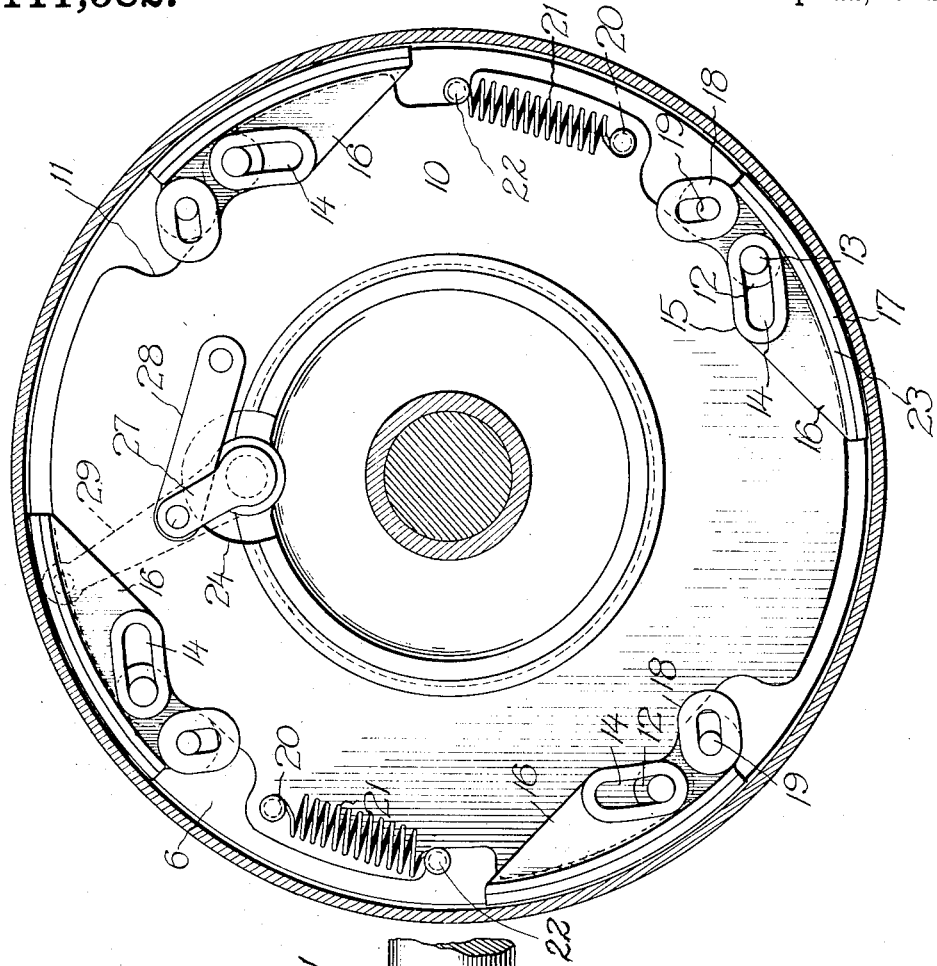
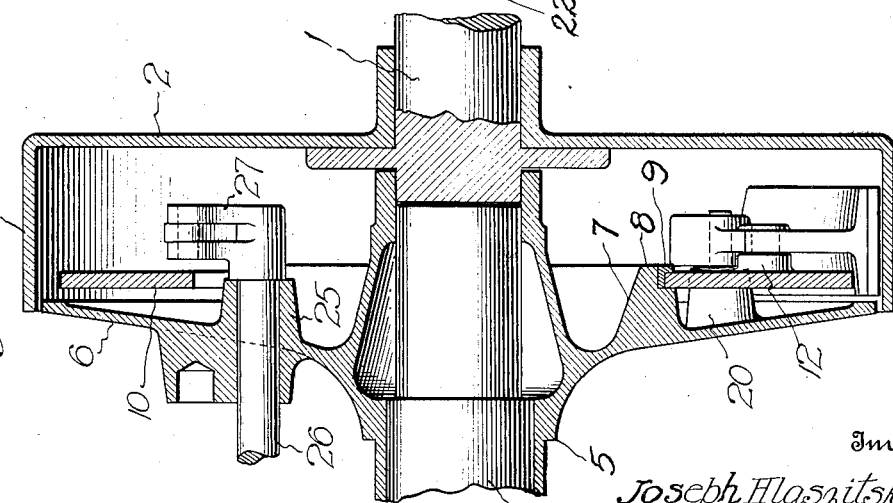
Witnesses
E. R. Barrett
Anna M. Dorr.
Inventor
Joseph Hlaszitska
By
Barthoff Kanthoff
Attorneys

UNITED STATES PATENT OFFICE.

JOSEPH HLASZITSKA, OF DETROIT, MICHIGAN.

BRAKE-CLUTCH.

1,111,582.  Specification of Letters Patent. Patented Sept. 22, 1914.

Application filed December 13, 1913. Serial No. 806,354.

*To all whom it may concern:*

Be it known that I, JOSEPH HLASZITSKA, a subject of the Emperor of Austria-Hungary, residing at Detroit, in the county of Wayne and State of Michigan, have invented certain new and useful Improvements in Brake-Clutches, of which the following is a specification, reference being had therein to the accompanying drawings.

This invention relates to a brake clutch specially designed for automobiles and similar vehicles.

The primary object of my invention is to provide positive and reliable means, in a manner as hereinafter set forth, for gripping and retarding the movement of a driven or revoluble body, without subjecting the braking mechanism to stresses and strains caused by the sudden and uneven application of the braking element or shoe.

Another object of my invention is to provide a hub member with a plurality of shoes arranged to be simultaneously brought into action without undue wear upon any particular part of the driven or revoluble element.

Another object of my invention is to accomplish the above results by a combination of elements that are strong and durable, easy to assemble, and highly efficient for the purposes for which they are intended.

Reference will now be had to the drawing, wherein, Figure 1 is a longitudinal sectional view of the brake clutch, and Fig. 2 is a transverse sectional view of the same.

In describing my invention by means of the drawing above referred to I desire to point out that I intend said views as merely illustrative of an example whereby my invention may be applied in practice, and I do not limit my claims to the precise arrangement and construction of parts indicated. The following description is therefore to be construed broadly as including substitute arrangements and constructions which are the obvious equivalents of those shown.

In the drawing, 1 denotes a driven element, as a shaft and mounted upon said shaft is a hub member comprising a disk 2 having a peripheral flange 3. Extending into the hub member is the end of an axle 4, which has a casing 5. The casing 5 is formed with an integral circular web 6 extending into proximity to the edges of the annular flange 3 of the hub member whereby said hub member is practically closed and the contents thereof protected from dust, stone bruises and the forces of nature. The inner side of the web 6 is provided with an annular bearing or collar 7 and mounted upon an annular seat 8 of said collar is a bushing or retaining ring 9. The bushing or retaining ring 9 coöperates with the seat 8 in holding the inner edge of the circular flat shoe shifting member 10 arranged within the hub member and having the periphery thereof contiguous to the flange 3. The periphery of the shoe shifting member 10 is provided with equally spaced cut away portions or recesses 11 and at one end of each recess is a boss 12 provided with a stud or pin 13. The stud or pin 13 extends through an oblong opening or slot 14 provided therefor in the thickened or reinforced portion 15 of a web 16, the web forming part of a segment shaped shoe 23 having a wear plate 17 for frictionally engaging the inner side of the flange 3. The shoes are four in number and the webs 16 of said shoes are provided with slotted enlargements 18 to receive studs or pins 19 carried by bosses 20 forming part of the web 6 of the casing 5. The cut-away portions or recesses 11 of the shoe shifting member 10 provide clearance for the bosses 20 and the slotted enlargements 18 are disposed at substantially right angles to the oblong openings or slots 14 of the web 16.

Diametrically opposed edges of the shoe shifting member 10 are provided with pins 20 connected by coiled retractile springs 21 to pins 22, carried by the web 6 of the casing 5. The member 10 is cut away sufficiently to provide clearance for the pins 22. The tension of the springs 22 is sufficient to retain the shoes 23 in a retracted position out of engagement with the flange 3.

The collar 7 and the retaining ring 9 are cut away, as at 24 to provide clearance for a bearing 25 forming part of the web 6. A rock shaft 26 is journaled in the bearing 25, said rock shaft having the inner end thereof provided with a bifurcated crank 27 which is pivotally connected by a link 28 to the side of the shoe shifting member 10. The outer end of the rock shaft 26 has a crank 29 adapted to be connected to a suitable operating mechanism (not shown).

When the shoe shifting member 10 is partially revolved upon the retaining ring 9, through the medium of the element 25 to 29 inclusive, the studs or pins 13 ride against the walls of the oblong openings or slots 14 and the webs 16 of the shoes 23 are shifted whereby the wear plates 17 of said shoes are brought into contact with the flange 3 of the hub member. The braking action of the shoe is distributed throughout the circumference of the flange 3 and not upon one side thereof, thereby eliminating stresses and strains upon the brake operating mechanism. With the slotted enlargements 10 disposed at right angles to the oblong openings or slots 14, the shoes 23 are moved at a tangent to the direction of movement of the shoe shifting member and immediately upon the brake operating mechanism being released, the springs 21 restore the shoe shifting member to its normal position whereby the shoes 23 are retracted.

What I claim is:—

In a brake clutch, a hub member having a flange, a stationary member extending into said hub member, a revoluble shoe shifting member supported between said stationary member and said hub member, spaced shoes arranged between the periphery of said shoe shifting member and the flange of said hub member, webs forming part of said shoe at the inner side of said shifting member, said webs having long and short slots formed therein with the short slots disposed at right angles to said long slots, studs carried by said shifting member and extending into the long slots of said webs, studs carried by said stationary member and extending into the short slots of said webs and coöperating with the first mentioned studs in guiding said shoes in a radial direction, means extending through said stationary member and connected to said shoe shifting member to facilitate moving the same whereby said shoes are shifted into engagement with the flange of said hub member, and means at diametrically opposed points connecting said stationary member and said shoe shifting member adapted to restore said shoe shifting member to its normal position.

In testimony whereof I affix my signature in presence of two witnesses.

JOSEPH HLASZITSKA.

Witnesses:
 ANNA M. DORR,
 G. E. McGRANN.